US012592414B2

(12) United States Patent
Fu et al.

(10) Patent No.: US 12,592,414 B2
(45) Date of Patent: Mar. 31, 2026

(54) SOLID ELECTROLYTE MEMBRANE, AND SOLID-STATE LITHIUM METAL BATTERY, BATTERY MODULE, BATTERY PACK, AND APPARATUS CONTAINING SUCH SOLID ELECTROLYTE MEMBRANE

(71) Applicant: CONTEMPORARY AMPEREX TECHNOLOGY (HONG KONG) LIMITED, Hong Kong (CN)

(72) Inventors: Jiawei Fu, Ningde (CN); Chengyong Liu, Ningde (CN); Bobing Hu, Ningde (CN); Qian Li, Ningde (CN); Meng Cheng, Ningde (CN); Yongsheng Guo, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 525 days.

(21) Appl. No.: 17/564,429

(22) Filed: Dec. 29, 2021

(65) Prior Publication Data
US 2022/0123353 A1 Apr. 21, 2022

Related U.S. Application Data

(63) Continuation of application No. PCT/CN2020/111910, filed on Aug. 27, 2020.

(30) Foreign Application Priority Data

Aug. 28, 2019 (CN) .......................... 201910802273.0

(51) Int. Cl.
H01M 10/056 (2010.01)
H01M 10/0525 (2010.01)

(52) U.S. Cl.
CPC ..... *H01M 10/056* (2013.01); *H01M 10/0525* (2013.01); *H01M 2220/20* (2013.01); *H01M 2300/0094* (2013.01)

(58) Field of Classification Search
CPC ........... H01M 10/056; H01M 10/0525; H01M 2220/20; H01M 2300/0094
(Continued)

(56) References Cited

U.S. PATENT DOCUMENTS

2008/0102363 A1* 5/2008 Uemura .................. H01M 4/66
429/162
2009/0291360 A1* 11/2009 Kim .................... H01M 50/449
429/144

(Continued)

FOREIGN PATENT DOCUMENTS

CN 104272518 A 1/2015
CN 105098127 A 11/2015
(Continued)

OTHER PUBLICATIONS

ISR for International Application PCT/CN2020/111910 mailed Nov. 27, 2020.

(Continued)

Primary Examiner — Allison Bourke
Assistant Examiner — Robert Gene West
(74) Attorney, Agent, or Firm — Ladas & Parry, LLP

(57) ABSTRACT

The solid electrolyte membrane in this application has a first surface and a second surface opposite the first surface, where the first surface is provided with several micropores that extend into an interior of the solid electrolyte membrane without penetrating to the second surface. This application further provides a solid-state lithium metal battery, battery module, battery pack, and apparatus containing such solid electrolyte membrane. In the solid electrolyte membrane
(Continued)

provided in this application, the micropores provided on the first surface of the solid electrolyte membrane do not penetrate to the opposite second surface, so that lithium ions can be induced to deposit in the micropores. This reduces the risk of lithium dendrites growing or even penetrating through the solid electrolyte membrane due to non-uniform deposition of lithium ions at other locations, thereby preventing short circuit of a solid-state lithium metal battery.

14 Claims, 5 Drawing Sheets

(58) Field of Classification Search
USPC ......................................................... 429/213
See application file for complete search history.

(56) References Cited

U.S. PATENT DOCUMENTS

| | | | | |
|---|---|---|---|---|
| 2012/0328971 A1* | 12/2012 | Matsuda | ............. | H01M 8/1246 |
| | | | | 429/479 |
| 2014/0193689 A1* | 7/2014 | Takami | ............. | H01M 10/0562 |
| | | | | 156/60 |
| 2015/0111110 A1* | 4/2015 | Watanabe | ........... | H01M 10/052 |
| | | | | 429/304 |
| 2017/0012319 A1 | 1/2017 | Anandan et al. | | |
| 2020/0251714 A1* | 8/2020 | Ryu | ........................ | H01M 4/13 |
| 2020/0251744 A1* | 8/2020 | Takada | ................ | H01M 50/451 |
| 2020/0266409 A1* | 8/2020 | Yoshimura | .......... | H01M 50/491 |

FOREIGN PATENT DOCUMENTS

| | | | | | |
|---|---|---|---|---|---|
| CN | 108376783 | A | 8/2018 | | |
| CN | 108448160 | A | 8/2018 | | |
| CN | 109390627 | A | 2/2019 | | |
| CN | 109818051 | A | 5/2019 | | |
| DE | 112013002219 | T5 | 1/2015 | | |
| JP | 2009211824 | A | * 9/2009 | | |
| JP | 2013109840 | A | 6/2013 | | |
| TW | I633696 | B | 8/2018 | | |
| WO | WO-2005043649 | A1 | * 5/2005 | .......... | H01M 10/052 |

OTHER PUBLICATIONS

Written Opinion for International Application PCT/CN2020/111910 mailed Nov. 27, 2020.
OA1 for counterpart application P201910802273.0 mailed Jul. 21, 2021.
OA2 for counterpart application P201910802273.0 mailed Sep. 27, 2021.
First Office Action of priority application CN201910802273.0 mailed Jul. 21, 2021.
Second Office Action of priority application CN201910802273.0 mailed Sep. 27, 2021.
Notification to Grant Patent Right for priority application CN201910802273.0 mailed Dec. 3, 2021.
First Search Report of priority application CN201910802273.0, mailed Jul. 14, 2021.
Supplemental search report of priority application CN201910802273.0, mailed Sep. 18, 2021.
Extended European search report of counterpart application EP20857408.7, mailed Aug. 18, 2022.

* cited by examiner

SOLID ELECTROLYTE MEMBRANE, AND SOLID-STATE LITHIUM METAL BATTERY, BATTERY MODULE, BATTERY PACK, AND APPARATUS CONTAINING SUCH SOLID ELECTROLYTE MEMBRANE

CROSS-REFERENCE TO RELATED APPLICATIONS

This application is a continuation of International Patent Application No. PCT/CN2020/111910 filed on Aug. 27, 2020, which claims priority to Chinese Patent Application No. 201910802273.0, filed on Aug. 28, 2019. The aforementioned patent applications are incorporated herein by reference in their entirety.

TECHNICAL FIELD

This application relates to the field of battery technologies, and in particular, to a solid electrolyte membrane, and a solid-state lithium metal battery, battery module, battery pack, and apparatus containing such solid electrolyte membrane.

BACKGROUND

To further increase capacity density of batteries, it is imperative to upgrade liquid-state lithium-ion secondary batteries to solid-state lithium secondary batteries. Current lithium secondary batteries mainly use liquid electrolyte materials including a large amount of organic solvent, leading to potential safety hazards of the liquid-state lithium secondary batteries. However, compared with liquid-state lithium secondary batteries, all-solid-state lithium secondary batteries have incomparable safety with the potential to completely eliminate safety hazards during use, and therefore can better meet the future development requirements in the field of electric vehicles and large-scale energy storage. Therefore, researchers from various countries are vigorously developing all-solid-state lithium secondary batteries.

However, the development of all-solid-state lithium secondary batteries is still confronted with certain problems, one of which is that non-uniform deposition of lithium ions in the battery causes lithium dendrites. Once the lithium dendrites penetrate through an electrolyte layer, positive and negative electrodes come into direct contact with each other, causing a short circuit in the battery. For liquid-state batteries, a short circuit in a battery causes the battery to release a large amount of heat in a short time, which may ignite the organic electrolyte and cause a fire or even an explosion. For all-solid-state batteries, although there is no risk of fire or explosion, the batteries also generate a large amount of heat after being short-circuited and therefore face potential danger. Therefore, a solution to the short circuit problem has become the key to the research of all-solid-state batteries.

SUMMARY

In view of the problems in the background, the purpose of this application is to provide a solid electrolyte membrane, and a solid-state lithium metal battery, battery module, battery pack, and apparatus containing such solid electrolyte membrane, to alleviate the technical problem of short circuit of solid-state lithium metal batteries.

To achieve the above objective, a first aspect of this application provides a solid electrolyte membrane, having a first surface and a second surface opposite the first surface, where the first surface is provided with several micropores that extend into an interior of the solid electrolyte membrane without penetrating to the second surface.

In some embodiments, an average diameter of the micropores ranges from 1 μm to 100 μm; and distribution density of the micropores on the first surface ranges from $10^2$ to $10^4$ pores per $cm^2$.

When the average diameter of the micropores and the distribution density of the micropores fall within the above ranges, the risk of a battery short circuit caused by lithium dendrites penetrating through a solid electrolyte can be effectively reduced, thereby improving overall safety of a battery.

In some embodiments, a pore wall of the micropores is perpendicular to the first surface or forms an acute angle with the first surface.

Setting the angle formed by the pore wall of the micropores and the first surface within the above range helps to simplify parameter settings for a preparation process.

In some embodiments, any two of the micropores do not communicate with each other.

Any two of the micropores are so set such that they do not communicate with each other, avoiding lithium dendrite migration in different micropores.

In some embodiments, the micropores have secondary micropores inside; and the secondary micropores do not penetrate to the second surface, and any two of the secondary micropores do not communicate with each other.

Providing the secondary micropores helps to further improve the safety performance of the battery.

In some embodiments, several electronic insulators are provided on the second surface, and the electronic insulators are located at projection locations of the micropores on the second surface.

Providing the electronic insulators helps to avoid short circuit occurring as a result of lithium dendrites deposited in the micropores penetrating through the electrolyte.

In some embodiments, a material of the electronic insulator is selected from organic polymers, including but not limited to fiber materials, rubber materials, or plastics; and a thickness of the electronic insulator ranges from 1 μm to 100 μm.

The above materials are selected for the electronic insulator and the thickness falls within the above range, helping to further improve the safety performance of the battery.

In some embodiments, projections of the electronic insulators on the second surface cover projections of the micropores on the second surface, but do not fully cover the second surface.

The electronic insulators are disposed at the foregoing locations, helping to prevent the lithium dendrites from penetrating through the electrolyte with minimum electronic insulators used.

In some embodiments, a material of the solid electrolyte membrane is selected from a combination of one or more of polymer solid electrolytes, sulfide solid electrolytes, and oxide solid electrolytes.

The material of the solid electrolyte membrane is selected from the above substances, helping to further improve the safety performance of the battery.

A second aspect of this application provides a solid-state lithium metal battery. The solid-state lithium metal battery includes a positive electrode membrane, a solid electrolyte membrane, and a negative electrode membrane stacked in sequence, where the solid electrolyte membrane is the solid electrolyte membrane in the first aspect of this application, the first surface of the solid electrolyte membrane is close to the negative electrode membrane, and the second surface of the solid electrolyte membrane is close to the positive electrode membrane.

This application further provides a battery module including the solid-state lithium metal battery as described above.

This application further provides a battery pack including the battery module as described above.

This application further provides an apparatus including the solid-state lithium metal battery or battery module or battery pack as described above.

Compared with the prior art, this application includes at least the following beneficial effects:

In the solid electrolyte membrane provided in this application, the several micropores provided on the first surface of the solid electrolyte membrane do not penetrate to the opposite second surface, so that lithium ions can be induced to deposit in the micropores, thereby reducing the risk of lithium dendrite growing and even penetrating through the solid electrolyte membrane due to nonuniform deposition of lithium ions at other locations, thereby preventing short circuit in a battery. The battery module, the battery pack, and the apparatus in this application include the solid-state lithium metal battery provided in this application, and therefore have at least the same advantages as the solid-state lithium metal battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
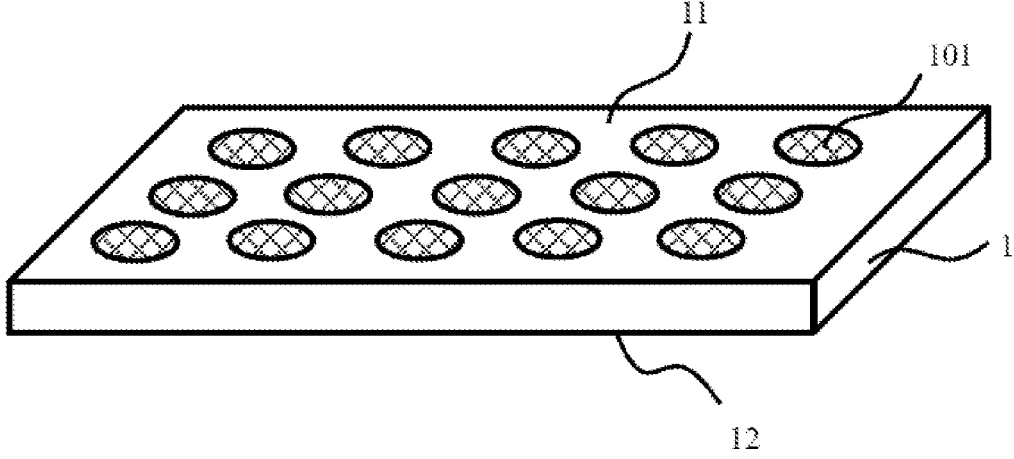
FIG. 1 is a schematic structural diagram of a solid electrolyte membrane according to a first embodiment of this application.

Reference signs are as follows:

1 solid electrolyte membrane
101 micropore
1011 secondary micropore
102 electronic insulator
11 first surface
12 second surface

2 negative electrode membrane
3 positive electrode membrane
4 battery pack
5 upper box body
6 lower box body
7 battery module
8 secondary battery

DETAILED DESCRIPTION

The following describes in detail a solid electrolyte membrane, a solid-state lithium metal battery, a battery module, a battery pack, and an apparatus according to this application.

Figure 2:
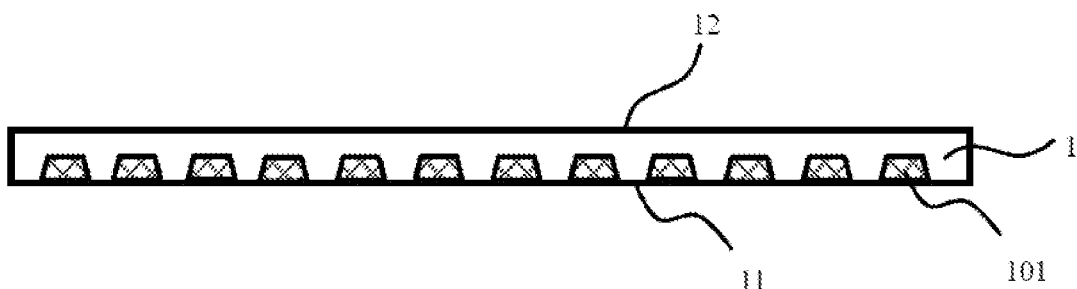
FIG. 2 is a cross-sectional view of the solid electrolyte membrane according to the first embodiment of this application.

A first embodiment of this application relates to a solid electrolyte membrane. FIG. 1 and FIG. 2 are a schematic structural diagram and a cross-sectional view of the solid electrolyte membrane in this embodiment, respectively. As shown in FIG. 1 and FIG. 2, the solid electrolyte membrane 1 has a first surface 11 and a second surface 12 opposite the first surface 11, where the first surface 11 is provided with several micropores 101 that extend into an interior of the solid electrolyte membrane 1 but do not penetrate to the second surface 12. The "several" herein means that the number of the micropores 101 is sufficient to effectively reduce the risk of battery short circuit caused by lithium dendrites penetrating through a solid electrolyte, thereby improving overall safety of a battery.

Optionally, in this application, a thickness of the solid electrolyte membrane ranges from 20 micrometers (μm) to 200 micrometers.

In a solid-state lithium metal battery, nonuniform deposition of lithium ions on a current collector leads to formation of lithium dendrites. If the lithium dendrites grow and penetrate through an electrolyte layer, positive and negative electrodes come into direct contact with each other, causing a battery short circuit. In the solid electrolyte membrane 1 in this embodiment, the first surface 11 of the solid electrolyte membrane 1 is formed with the several micropores 101 that extend into the interior of the solid electrolyte membrane 1 but do not penetrate to the second surface 12. This can induce the lithium ions to deposit in the micropores 101, reducing the risk of lithium ion deposition or lithium dendrite growth at other locations, thereby alleviating a problem of battery short circuit.

Specifically, when the solid electrolyte membrane 1 in this embodiment is applied to a solid-state lithium metal battery, the first surface 11 of the solid electrolyte membrane 1 is made close to a lithium metal negative electrode (that is, an anode membrane of the battery), and the second surface 12 is made close to a positive electrode (that is, a cathode membrane of the battery). In a battery discharge process, electrons of the lithium metal negative electrode reach the positive electrode of the battery along an external circuit. Lithium ions pass from the lithium metal negative electrode through the solid electrolyte along non-microporous locations of the solid electrolyte (in a gap, the electrode is not in contact with the electrolyte membrane) to reach the positive electrode, and then are intercalated in the positive electrode material. In the battery charging process, electrons of the positive electrode reach the lithium metal negative electrode along the external circuit, and lithium ions pass from the positive electrode through the solid electrolyte to reach the lithium metal negative electrode, and then the electrons are received and deposit at the negative electrode. In this case, if the lithium ions are not uniformly deposited, lithium dendrites grow at the negative electrode, and even penetrate through the solid electrolyte, causing the risk of battery short circuit. In the solid electrolyte membrane 1 in this embodiment, the first surface 11 of the solid electrolyte membrane 1 has the several micropores 101. Because stress generated when lithium dendrites deposit or grow outside the micropores 101 is greater than stress generated when the lithium dendrites deposit or grow inside the micropores 101, the lithium dendrites preferentially deposit and grow inside the micropores 101. In a next discharge process, as the lithium ions from the negative electrode diffuse to the positive electrode, the lithium dendrites deposited or grown in the micropores 101 are consumed, thereby reducing the risk of battery short circuit caused when the lithium dendrites penetrate through the solid electrolyte, and improving the overall safety of the battery.

The number and depth of the micropores 101 are determined by a thickness and surface tolerance of the lithium metal negative electrode used in the solid-state lithium metal battery, conductivity of the electrolyte, a process requirement, and the like. Generally speaking, an average diameter of the micropores 101 ranges from 1 μm to 100 μm; and distribution density of the micropores 101 on the first surface ranges from $10^2$ pores per square centimeter (pores/$cm^2$) to $10^4$ pores per square centimeter. The diameter and distribution density of the micropores 101 can be measured by using a conventional scanning electron microscope (SEM) in the art.

In some embodiments, a surface area of all micropores accounts for 1% to 50% of a surface area of the solid electrolyte membrane, optionally 5% to 40%, and further optionally 7.5% to 35%.

According to one aspect of this application, a pore wall of the micropores 101 is perpendicular to the first surface or forms an acute angle with the first surface. This makes a larger deposition area of lithium ions in the micropores 101, and also facilitates micropore processing.

According to one aspect of this application, any two of the micropores 101 do not communicate with each other, thereby avoiding accumulation of lithium ions deposited in the micropores 101 and acceleration of lithium dendrite growth.

In addition, a material of the solid electrolyte membrane 1 in this embodiment may be selected from one or more of the following substances: polymer solid electrolytes, such as polyethylene oxide (PEO), polyacrylonitrile (PAN), polyvinylidene fluoride (PVDF), polymethyl methacrylate (PMMA), or mixtures thereof; sulfide solid electrolytes, such as lithium tetrathiophosphate ($Li_3PS_4$), lithium undecathio triphosphate ($Li_7P_3S_{11}$), lithium heptathiodiphosphate ($Li_4P_2S_7$), or mixtures thereof; and oxide solid electrolytes, such as lithium lanthanum zirconium oxide (LLZO), lithium lanthanum titanium oxide (LLTO), lithium aluminum titanium phosphate (LATP), or mixtures thereof. Correspondingly, for an oxide solid electrolyte or sulfide solid electrolyte, the micropores 101 may be formed by using a mold with protrusions on its surface; and for a polymer solid electrolyte, the micropores 101 may be formed by using a roller with protrusions on its surface, or a uniaxial stretching or biaxial stretching method. The micropores 101 may alternatively be formed in a film formation process, and the size and shape of the micropores 101 may be adjusted by adjusting process parameters in the film formation process. Optionally, a mold may be used to form the solid electrolyte membrane, and the several micropores that do not penetrate to the opposite second surface are formed on one surface of the solid electrolyte membrane. There is no limitation on the shape of the micropores 101, and the shape of the micropores 101 can be adjusted through the shape of the mold in the preparation process based on an actual need.

Figure 3:
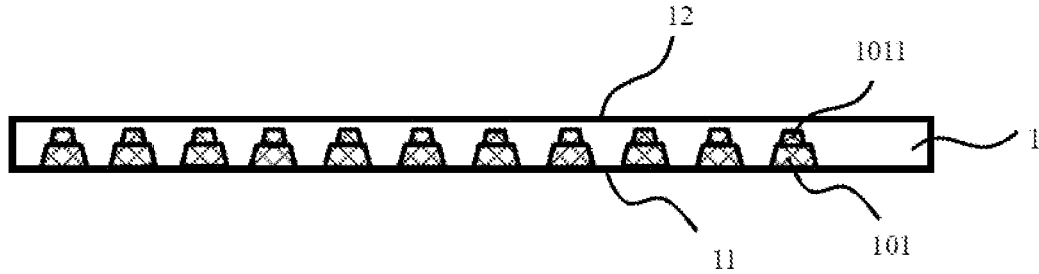
FIG. 3 is a cross-sectional view of a solid electrolyte membrane according to a second embodiment of this application.

A second embodiment of this application also relates to a solid electrolyte membrane, and is an improvement of the first embodiment. Specifically, on the basis of the first embodiment, secondary micropores 1011 are added inside of the micropores 101. FIG. 3 is a cross-sectional view of the solid electrolyte membrane in this embodiment. As shown in FIG. 3, the secondary micropores 1011 do not penetrate to the second surface 12 either, and any two of the secondary micropores 1011 do not communicate with each other. Optionally, a diameter of the secondary micropore 1011 is smaller than a diameter of the micropore 101. In an example, the secondary micropores 1011 may also be disposed by using the method the same as the micropores 101 except for a different mold or roller used. Similarly, there is no limitation on the shape of the secondary micropores 1011 either, and the shape of the secondary micropores 1011 can be adjusted through the shape of the mold in the preparation process based on an actual need.

Settings of the secondary micropores 1011 are also determined by a thickness and surface tolerance of the lithium metal negative electrode used in the solid-state lithium metal battery, conductivity of the electrolyte, a process requirement, and the like. Adding the secondary micropores 1011 can improve the function of inducing lithium ion deposition, further reduce the possibility of lithium dendrites growing and then penetrating through the solid electrolyte, and more effectively avoid a battery short circuit.

Figure 4:
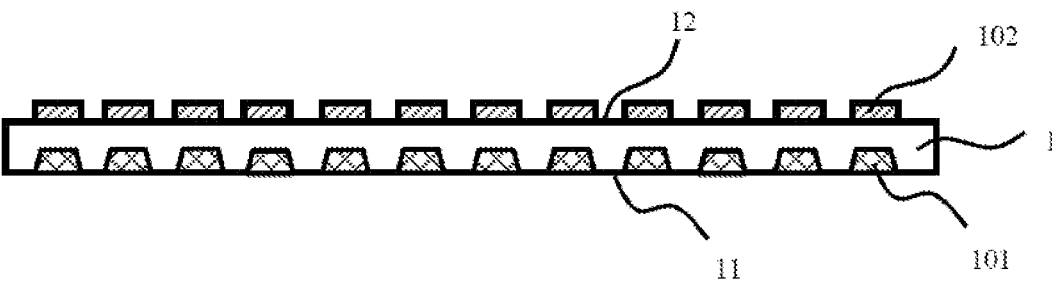
FIG. 4 is a cross-sectional view of a solid electrolyte membrane according to a third embodiment of this application.

A third embodiment of this application also relates to a solid electrolyte membrane, and is another improvement of the first embodiment. FIG. 4 is a cross-sectional view of the solid electrolyte membrane in this embodiment. As shown in FIG. 4, in the solid electrolyte membrane 1 in this embodiment, not only a first surface 11 is provided with several micropores 101 that do not penetrate to a second surface 12, but also the second surface 12 is provided with several electronic insulators 102. The electronic insulators 102 are located at projection locations of the micropores 101 on the second surface 12 (projection locations of the micropores 101 on the second surface 12 along a normal direction of the membrane, that is, a direction perpendicular to the surface of the membrane). The "several" herein means that the number of the electronic insulators 102 should guarantee that projections of the micropores 101 on the second surface 12 are fully covered but the second surface 12 is not. Under this premise, the electronic insulators 102 should not be so many as to block a channel for free migration of lithium ions.

The function of the electronic insulators 102 in this embodiment is as follows: According to the description in the first embodiment, the lithium ions preferentially deposit in the micropores 101 to grow lithium dendrites. However, when long lithium dendrites grow in the micropores 101, the lithium dendrites may also reach the top of the micropores 101 and penetrate through the electrolyte. In this regard, the solid electrolyte membrane in this embodiment is further provided with the several electronic insulators 102 on the second surface 12, and the electronic insulators 102 are located at the projection locations of the micropores 101 on the second surface 12. After penetrating through the electrolyte, the lithium dendrites in the micropores 101 are wrapped by the electronic insulators 102 at the projection locations of the micropores, and can neither continue to grow nor further reach the positive electrode, thereby avoiding short circuit. Similarly, in a next discharge process, as the lithium ions in the negative electrode diffuse to the positive electrode, the lithium dendrites are consumed. In this way, the solid electrolyte membrane structure in this embodiment can more effectively avoid short circuit.

A material of the electronic insulator 102 may be selected from organic polymers with high electronic resistivity ($>10^5$ ohms meters ($\Omega \cdot m$)) and high fracture toughness ($>1$ $KN \cdot m^{3/2}$ $(KN \cdot m)^{-3/2}$), including but not limited to fiber materials, rubber materials, or plastics; and a thickness of the electronic insulator ranges from 1 μm to 100 μm. Optionally, the electronic insulators 102 may be disposed on the second surface 12 in a formation process of the solid electrolyte membrane. In an example, the electronic insulators 102 may be provided through, for example, comma coating (comma coating).

According to one aspect of this application, the projections of the electronic insulators 102 on the second surface 12 cover the projections of the micropores 101 on the second surface 12 but do not fully cover the second surface 12, thereby ensuring that the electronic insulators 102 can wrap all the lithium dendrites that penetrate through the electrolyte to prevent the lithium dendrites from continuing to grow.

Figure 5:
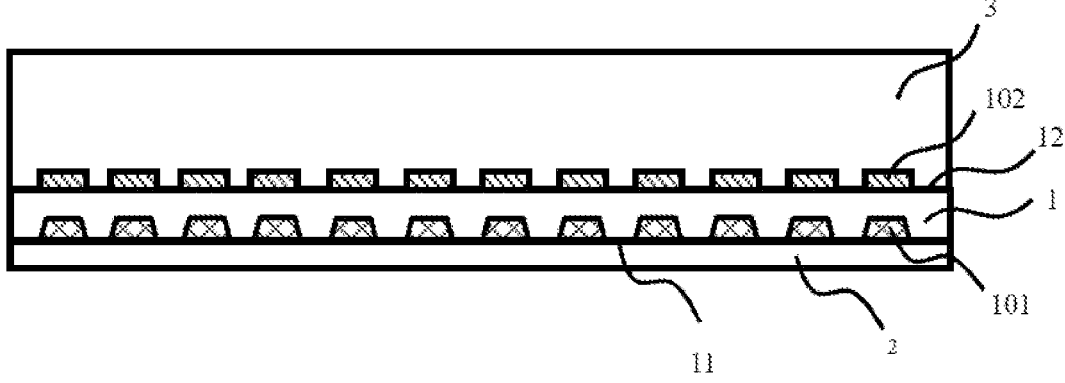
FIG. 5 is a cross-sectional view of a solid-state lithium metal battery according to a fourth embodiment of this application.

A fourth embodiment of this application relates to a solid-state lithium metal battery, and FIG. 5 is a cross-sectional view of the solid-state lithium metal battery in this embodiment. Specifically, the solid-state lithium metal battery in this embodiment includes a positive electrode membrane 3, a solid electrolyte membrane 1, and a negative electrode membrane 2 that are stacked in sequence. The solid electrolyte membrane 1 may be any one of the solid electrolyte membranes in the first to third embodiments. The first surface 11 of the solid electrolyte membrane 1 is close to the negative electrode membrane 2 and the second surface 12 of the solid electrolyte membrane 1 is close to the positive electrode membrane 3.

Figure 6:
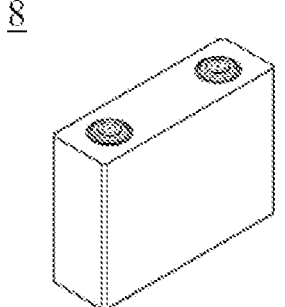
FIG. 6 is a schematic diagram of an embodiment of a secondary battery.

This application does not impose special limitations on a shape of the secondary battery, and the lithium-ion battery may be of a cylindrical shape, a square shape, or any other shapes. FIG. 6 shows a secondary battery 8 of a square structure as an example.

In some embodiments, the secondary battery may be assembled into a battery module, and the battery module may include a plurality of secondary batteries. A specific quantity may be adjusted based on application and a capacity of the battery module.

Figure 7:
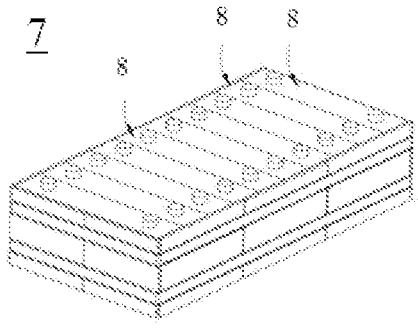
FIG. 7 is a schematic diagram of an embodiment of a battery module.

FIG. 7 shows a battery module 7 as an example. Referring to FIG. 7, in the battery module 7, a plurality of secondary batteries 8 may be sequentially arranged along a length direction of the battery module 7; or certainly, may be arranged in any other manner. Further, the plurality of secondary batteries 8 may be fastened through fasteners.

In some embodiments, the battery module 7 may further include a housing with an accommodating space, and the plurality of secondary batteries 8 are accommodated in the accommodating space.

In some embodiments, the battery module may alternatively be assembled into a battery pack, and the number of battery modules included in the battery pack may be adjusted based on application and a capacity of the battery pack.

Figure 8:
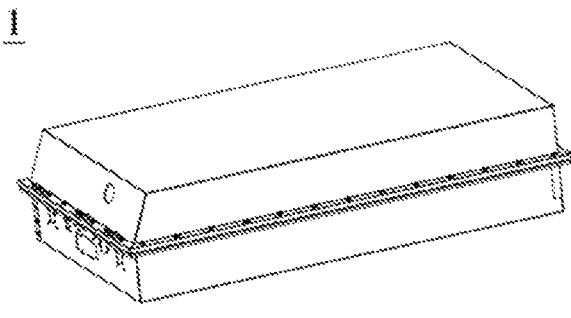
FIG. 8 is a schematic diagram of an embodiment of a battery pack.
Figure 9:
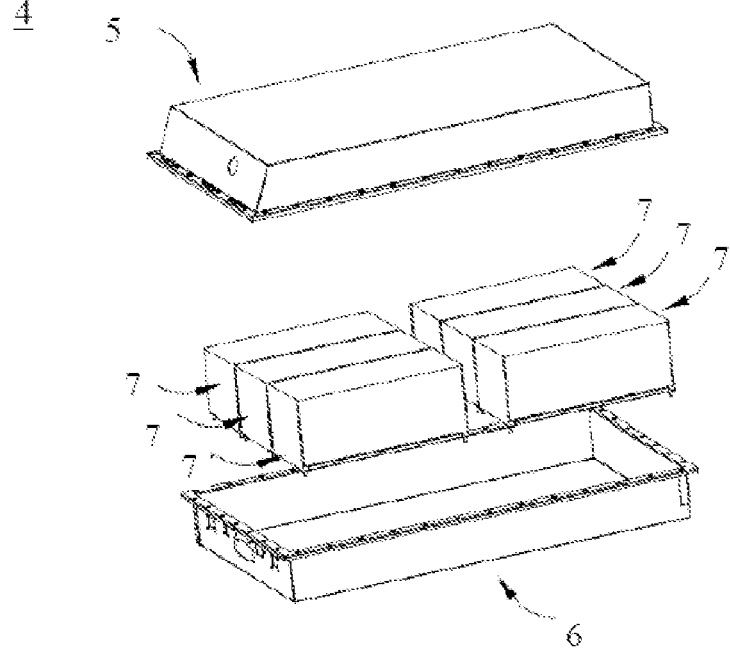
FIG. 9 is an exploded view of FIG. 8.

FIG. 8 and FIG. 9 show a battery pack 4 as an example. Referring to FIG. 8 and FIG. 9, the battery pack 4 may include a battery box and a plurality of battery modules 7 arranged in the battery box. The battery box includes an upper box body 5 and a lower box body 6. The upper box body 5 can cover the lower box body 6 to form an enclosed space for accommodating the battery modules 7. The plurality of battery modules 7 may be arranged in the battery box in any manner.

Apparatus

A third aspect of this application provides an apparatus. The apparatus includes the secondary battery in the second aspect of this application. The secondary battery may serve as a power supply of the apparatus, or may serve as an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery (Cell), a battery module (Module), or a battery pack (Pack) may be selected for the apparatus according to use requirements of the apparatus.

Figure 10:
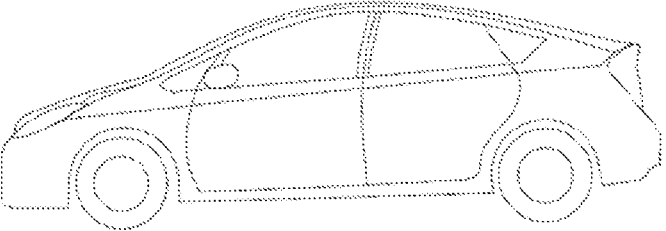
FIG. 10 is a schematic diagram of an embodiment of an apparatus using a secondary battery as a power source.

FIG. 10 shows an apparatus as an example. The apparatus is a battery electric vehicle, a hybrid electric vehicle, a plug-in hybrid electric vehicle, or the like. To meet a requirement of the apparatus for high power and high energy density of a secondary battery, a battery pack or a battery module may be used.

In another example, the apparatus may be a mobile phone, a tablet computer, a notebook computer, or the like. The apparatus is generally required to be light and thin, and may use a secondary battery as a power source.

Specific examples and comparative examples of solid-state lithium metal batteries in this embodiment are shown below to further illustrate the technical effects of this application. It should be understood that this embodiment is only intended to illustrate this application but not to limit the scope of this application.

EXAMPLES

In the following examples, diameters of the prepared solid electrolyte batteries are all 22 millimeters (mm). To reduce interference between layers, and to more clearly illustrate the effects of the technical solution, the solid electrolyte batteries prepared in the examples all include only a positive electrode, a solid electrolyte membrane, and a negative electrode that are stacked together.

Example 1

(1) Preparation of a Solid Electrolyte

In a dry argon atmosphere (a moisture concentration was lower than 1 ppm, and an oxygen concentration was lower than 1 ppm), a solid electrolyte polyethylene oxide (PEO)-based polymer of a thickness of 100 μm was rolled in on a roller with protrusions, so that several micropores that did not penetrate to an opposite second surface were formed on a first surface of the polymer solid electrolyte. A diameter of the micropore was 10 μm, distribution density of the micropores was 100 pores/cm$^2$, and a depth of the micropore was 10 μm.

Several electronic insulators made of polytetrafluoroethylene (PTFE) were formed on the second surface opposite the first surface of the solid electrolyte, so that these electronic insulators were located at projection locations of the micropores on the second surface, and projections of the electronic insulators on the second surface covered projections of the micropores on the second surface but did not fully cover the second surface. The electronic insulator had a thickness of 10 μm and a diameter of 12 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Example 2

(1) Preparation of a Solid Electrolyte

In a dry argon atmosphere (a moisture concentration was lower than 1 ppm, and an oxygen concentration was lower than 1 ppm), a mold with protrusions on its surface was used, so that several micropores that did not penetrate to an opposite second surface were formed on a first surface of a solid electrolyte lithium lanthanum zirconium oxide (LLZO) with a thickness of 100 μm. A diameter of the micropore was 80 μm, distribution density of the micropores was $10^3$ pores/cm$^2$, and a depth of the micropore was 20 μm.

Several electronic insulators made of styrene-butadiene rubber were formed on the second surface opposite the first surface of the solid electrolyte, so that these electronic insulators were located at projection locations of the micropores on the second surface, and projections of the electronic insulators on the second surface covered projections of the micropores on the second surface but did not fully cover the second surface. The electronic insulator had a thickness of 20 μm and a diameter of 100 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Example 3

(1) Preparation of a Solid Electrolyte

In a dry argon atmosphere (a moisture concentration was lower than 1 ppm, and an oxygen concentration was lower than 1 ppm), a mold with protrusions on its surface was used, so that several micropores that did not penetrate to an opposite second surface were formed on a first surface of a solid electrolyte lithium phosphorus sulfide (Li$_3$PS$_4$) with a thickness of 100 μm. A diameter of the micropore was 15 μm, distribution density of the micropores was $10^4$ pores/cm$^2$, and a depth of the micropore was 25 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Example 4

(1) Preparation of a Solid Electrolyte

In a dry argon atmosphere (a moisture concentration was lower than 1 ppm, and an oxygen concentration was lower than 1 ppm), a mold with protrusions on its surface was used, so that several micropores that did not penetrate to an opposite second surface and secondary micropores located in the micropores were formed on a first surface of a solid electrolyte lithium phosphorus sulfide (Li$_3$PS$_4$) with a thickness of 100 μm. A diameter of the micropore was 15 μm, distribution density of the micropores was $10^4$ pores/cm$^2$, and a depth of the micropore was 25 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Example 5

(1) Preparation of a Solid Electrolyte

In a dry argon atmosphere (a moisture concentration was lower than 1 ppm, and an oxygen concentration was lower than 1 ppm), a mold with protrusions on its surface was used, so that several micropores that did not penetrate to an opposite second surface and secondary micropores located in the micropores were formed on a first surface of a solid electrolyte lithium phosphorus sulfide (Li$_3$PS$_4$) with a thickness of 100 μm. A diameter of the micropore was 15 μm, distribution density of the micropores was $10^4$ pores/cm$^2$, and a depth of the micropore was 25 μm.

Several electronic insulators made of glass fiber were formed on the second surface opposite the first surface of the solid electrolyte, so that these electronic insulators were located at projection locations of the micropores on the second surface, and projections of the electronic insulators on the second surface covered projections of the micropores on the second surface but did not fully cover the second surface. The electronic insulator had a thickness of 10 μm and a diameter of 12 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Example 6

(1) Preparation of a Solid Electrolyte

In a dry argon atmosphere (a moisture concentration was lower than 1 ppm, and an oxygen concentration was lower than 1 ppm), a mold with protrusions on its surface was used, so that several micropores that did not penetrate to an opposite second surface were formed on a first surface of a solid electrolyte lithium phosphorus sulfide (Li$_3$PS$_4$) with a thickness of 100 μm. A diameter of the micropore was 15 μm, distribution density of the micropores was $10^4$ pores/cm$^2$, and a depth of the micropore was 25 μm.

Several electronic insulators made of polyamide were formed on the second surface opposite the first surface of the solid electrolyte, so that these electronic insulators were located at projection locations of the micropores on the second surface, and projections of the electronic insulators on the second surface covered projections of the micropores on the second surface but did not fully cover the second surface. The electronic insulator had a thickness of 20 μm and a diameter of 100 μm.

(2) Preparation of a Solid-State Lithium Metal Battery

A battery positive electrode material lithium iron phosphate, a battery negative electrode material lithium metal, and the solid electrolyte obtained in step (1) were used to prepare a laminated battery. The laminated battery was subjected to a 0.5 C charge/discharge cycle, and the number of cycles was recorded.

Comparative Example 1

In a dry argon atmosphere (a moisture concentration was lower than 1 ppm, and an oxygen concentration was lower than 1 ppm), a solid electrolyte lithium phosphorus sulfide ($Li_3PS_4$) polymer not undergone roll-in or mold-based pore making, a positive electrode lithium iron phosphate, a negative electrode lithium metal were made into a laminated battery. The battery was subjected to a 0.5 C charge/discharge cycle, and the number of cycles was recorded.

Table 1 below shows results of short circuit tests conducted in Examples 1 to 6 and Comparative Example 1.

TABLE 1

| Test results of examples and comparative example | |
| --- | --- |
| Battery No. | Cycling test result |
| Example 1 | Not short-circuited after 100 cycles |
| Example 2 | Not short-circuited after 100 cycles |
| Example 3 | Short-circuited after 55 cycles |
| Example 4 | Short-circuited after 74 cycles |
| Example 5 | Not short-circuited after 100 cycles |
| Example 6 | Not short-circuited after 100 cycles |
| Comparative Example 1 | Short-circuited after 3 cycles |

It can be learned from the above results that the solid-state lithium metal battery in Comparative Example 1 was short-circuited after 3 cycles, the solid-state lithium metal battery in Example 3 was short-circuited after 55 cycles, and the solid-state lithium metal battery in Example 4 was short-circuited after 74 cycles. However, none of the solid-state lithium metal batteries in Examples 1, 2, 5, and 6 was short-circuited after 100 cycles. It indicates improvements made on structure of the solid electrolyte membrane in this application significantly reduced the risk of short circuit of the solid-state lithium metal battery.

According to the disclosure and teachings of this specification, those skilled in the art may further make changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. A solid electrolyte membrane having a first surface and a second surface opposite the first surface, wherein the first surface is provided with a plurality of isolated and non-overlapping micropores by imprinting the first surface using a mold or roller having a plurality of protrusions extending into an interior of the solid electrolyte membrane without penetrating to the second surface, and a projection of each of the plurality of micropores on the second surface along a normal direction of the membrane on the second surface is isolated from, and non-overlapping with, a projection of any other micropore of the plurality of micropores.

2. The solid electrolyte membrane according to claim 1, wherein an average diameter of the plurality of micropores is from 1 μm to 100 μm; and a distribution density of the plurality of micropores on the first surface is from $10^2$ pores per $cm^2$ to $10^4$ pores per $cm^2$.

3. The solid electrolyte membrane according to claim 1, wherein a pore wall of the plurality of micropores is perpendicular to the first surface or form an acute angle with the first surface.

4. The solid electrolyte membrane according to claim 1, wherein the plurality of micropores do not communicate with each other.

5. The solid electrolyte membrane according to claim 1, wherein the plurality of micropores have secondary micropores inside; and the secondary micropores do not penetrate to the second surface, and the secondary micropores do not communicate with each other.

6. The solid electrolyte membrane according to claim 1, further comprising a plurality of electronic insulators on the second surface, and the plurality of electronic insulators are located at projections of the plurality of micropores along a normal direction of the membrane on the second surface.

7. The solid electrolyte membrane according to claim 6, wherein a material of the electronic insulator comprises organic polymers; and a thickness of the electronic insulator is from 1 μm to 100 μm.

8. The solid electrolyte membrane according to claim 6, wherein projections of the plurality of electronic insulators along the normal direction of the membrane on the second surface cover the projections of the plurality of micropores on the second surface, but do not fully cover the second surface.

9. The solid electrolyte membrane according to claim 1, wherein a material of the solid electrolyte membrane comprises one or more of polymer solid electrolytes, sulfide solid electrolytes, and oxide solid electrolytes.

10. A solid-state lithium metal battery, comprising a positive electrode membrane, the solid electrolyte membrane of claim 1, and a negative electrode membrane that are stacked in sequence, wherein the first surface of the solid electrolyte membrane is adjacent to the negative electrode membrane, and the second surface of the solid electrolyte membrane is adjacent to the positive electrode membrane.

11. A battery module, comprising the solid-state lithium metal battery according to claim 10.

12. A battery pack, comprising the battery module according to claim 11.

13. An apparatus, comprising the battery pack according to claim 12.

14. The solid electrolyte membrane according to claim 7, wherein the organic polymers comprise fiber, rubber, or plastic.

* * * * *